2,889,316
Patented June 2, 1959

2,889,316
MONOAZO DYESTUFFS

Alphonse Heckendorn, Basel, Alfred Fasciati, Bottmingen, and Heinrich Zollinger, Binningen, Switzerland, assignors to Ciba Limited, Basel, Switzerland, a Swiss firm No Drawing. Application July 25, 1955
Serial No. 524,274

Claims priority, application Switzerland July 30, 1954

12 Claims. (Cl. 260—153)

This invention provides monoazo-dyestuffs of the type of the dyestuff of the formula (1)
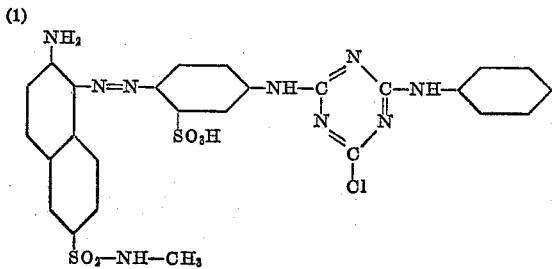

The monazo-dyestuffs of this invention correspond to the general formula (2) $\quad\quad\quad R—N=N—R_1—X$ in which R represents the radical of an aminonaphthalene sulfonic acid amide bound to the azo linkage in a position vicinal to the amino group, $R_1$ represents the radical of a diazo-component of the benzene series, and X represents a substituted amino group containing a triazine group having a reactive halogen atom, and in which the radical —$R_1$—X contains a group imparting solubility in water, advantageously a sulfonic acid group.

The invention also includes a process for the manufacture of these monoazo-dyestuffs, wherein an aminonaphthalene sulfonic acid amide is coupled in an acid medium with a diazo compound of an amine of the formula (3) $\quad\quad\quad H_2N—R_1—X$ in which the symbols $R_1$ and X have the meanings given above.

As coupling components of the aforesaid kind there may be mentioned, for example: 1-aminonaphthalene-4-sulfonic acid - N - methyl-anilide, 1-aminonaphthalene-5-sulfonic acid methylamide, 1-aminonaphthalene-5-sulfonic acid N - methyl - anilide, 2-aminonaphthalene-6-methyl- or -ethyl- or -para-tolyl- or -phenyl-sulfone, 2-aminonaphthalene-5- or -6- or -7- or -8-sulfonic acid amide, 2-aminonaphthalene-3:6- or -5:7-disulfonic acid amide, 2-amino-8-hydroxynaphthalene - 3:6 - disulfonic acid amide, 2-amino-3- or -5-hydroxynaphthalene-7-sulfonic acid amide, 2-methylamino-, 2-β-hydroxyethylamino- or 2-phenylamino-8-hydroxy-naphthalene-6-sulfonic acid amide, and advantageously 2-amino-8-hydroxynaphthalene-6-sulfonic acid amide and 2-amino-8-hydroxynaphthalene-6-sulfonic acid methyl or ethyl or β-hydroxyethyl- or β-hydroxypropyl or 3'-methoxypropyl- or -cyclohexyl- or -phenyl- or -dimethyl- or -diethyl- or N-methyl-phenyl- or N-ethyl-phenyl or N-methyl-N-β-hydroxy-ethyl amide.

The amines of the Formula 3 which are used as starting materials in the present process can be made by methods in themselves known, for example, by condensing 1 molecular proportion of an amine which contains in addition to the diazotizable amino group a reactive hydrogen atom bound to a nitrogen atom, with one molecular proportion of a reactive halogenated 1,3,5-triazine compound, which, in addition to the reactive halogen atom, contains a further reactive halogen atom, which easily splits off in alkaline media and, if the amine used contains no free sulfonic acid group, a group imparting solubility in water, advantageously a sulfonic acid group. As reactive halogenated 1,3,5-triazine compounds suitable for preparing the amines of Formula 3 there may be mentioned: 2:4:6-trichloro-1:3:5-triazine, and above all dihalogen-triazines of the formula (4)
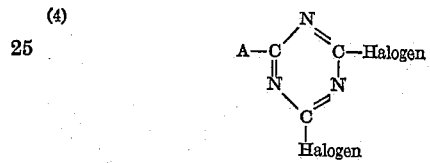

in which A represents an —$NH_2$-group or a radical advantageously containing at most 12 carbon atoms and bound directly or advantageously through an oxygen, sulfur or nitrogen bridge to the triazine nucleus.

Thus, there are especially useful in the present process diazo-components containing a cyanuric ring, for example, those obtainable from diamines of the benzene series by reacting the diamine with one molecular proportion of cyanuric chloride and exchanging a further chlorine atom in the resulting primary condensation product for the radical of a compound of the aliphatic, alicyclic, heterocyclic or aromatic series containing a mobile hydrogen atom and advantageously at most 12 carbon atoms. As compounds containing at most 12 carbon atoms there come into consideration, for example, ammonia, aliphatic or aromatic hydroxyl-compounds, mercaptans and above all organic nitrogen compounds such as amines, for example, aliphatic, cycloaliphatic, aromatic or heterocyclic primary or secondary amines, and also amides, amino-alcohols, amino-acids, urethanes and the like. However, it is of advantage to carry out the condensation with these compounds first, and to condense the resulting cyanuric halide of the Formula 4 simultaneously or subsequently with one molecular proportion of a diamine.

The condensation with the halogenated 1,3,5-triazine compounds is advantageously carried out in the presence of an acid-binding agent such as sodium carbonate. In all these reactions it will be understood that they are carried out in such manner that the finished product still contains a reactive halogen atom.

Especially valuable monoazo-dyestuffs are obtained from the condensation products of 1 molecular proportion of 2:5-diaminobenzene-1-sulfonic acid or 2:4-diaminobenzene-1-sulfonic acid with 1 molecular proportion of a primary condensation product of cyanuric chloride with 1 molecular proportion of one of the following compounds:

Alcohols and phenols, such as methyl alcohol, ethyl alcohol or butyl alcohol, phenol, ortho-, meta- or para-cresol, 4-secondary-butyl-phenol, 4-tertiary-amyl-phenol, dialkyl-phenols, para-chlorophenol, thiophenol, ammonia, methylamine, dimethylamine, ethylamine, diethylamine, isopropylamine, butylamine, hexylamine, phenylamine, tolylamine, 4-chloro-phenylamine, N-methyl-phenylamine or cyclohexylamine and also ethanolamines, β-hydroxypropylamine, acetamide, butyric acid amide, urea, thiourea, toluene sulfonic acid amide, glycocoll, aminocarbonic acid esters such as the methyl or ethyl ester, aminoacetic acid ethyl ester, aminoacetamide, aminonaphthalene-sulfonamides, aminobenzene-sulfonamides or -sulfones and also the condensation products of 1 molecular proportion of one of the following diamines:

1:3- or 1:4-diaminobenzene, 4:4'-diamino-diphenyl-methane, 4:4'-dimethyl-3:3'-diamino-diphenyl methane, 4:4'-diaminodiphenyl, 4:4'- or 2:4'-diamino-diphenyl ether, 4:4'-dichloro-2:2'-diamino-diphenyl ether, 4:4'- or 2:2'-diamino-diphenyl sulfide, 4:4'- or 3:3'-diamino-diphenylsulfone, 2:5-diaminobenzene-1-methyl sulfone, 2:5-diaminobenzene-1-ethyl sulfone, 2:5-diamino-4'-methyl-1:1'-diphenyl sulfone, 2:5-diamino-1:1'-diphenyl sulfone, 2:5-diaminobenzene-1-sulfonic acid amide, 2:5-diaminobenzene 1-sulfonic acid methylamide or ethylamide or phenylamide or para-tolylamide, 2:5-diaminobenzene-1-sulfonic acid dimethylamide or diethylamide, 2:5-diaminobenzene-1-sulfonic acid cyclohexylamide, 2:5-diaminobenzene-1-sulfonic acid N-methylanilide or N-ethylanilide with 1 molecular proportion of a primary condensation product of cyanuric chloride with 1 molecular proportion of 1- or 2-aminonaphthalene-4- or -6-sulfonic acid, 1-aminobenzene-3- or -4-sulfonic acid.

The amines used as starting materials in the present process can be diazotized by methods in themselves known, for example, with the aid of a mineral acid especially hydrochloric acid and sodium nitrite or by one of the methods customarily used for compounds difficult to diazotize, for example, with the aid of nitrosyl-sulfuric acid. In the latter case it is often of advantage to couple the diazo-compounds, after diluting the diazotization mixture with water to precipitate the compound and filtering it off. Coupling is carried out in an acid medium, for example, a medium which is weakly acid to Congo to an acetic acid medium. It is often advisable to neutralize the mineral acid set free by the coupling reaction, for example, with sodium acetate.

The dyestuffs are isolated from the coupling medium in such manner that the isolated product still contains a reactive halogen atom.

The new dyestuffs of the above general Formula 2 can also be obtained by a modification of the process, wherein one molecular proportion of a monoazo-dyestuff of the formula (5)    R—N=N—R₁—Z in which R represents the radical of an aminonaphthalene sulfonic acid bound to the azo group in a position vicinal to the amino group, R₁ represents the radical of a diazo-component of the benzene series, and Z represents an amino group containing at least one reactive hydrogen atom, is condensed with a reactive halogenated 1,3,5-triazine compound which contains more than one reactive halogen atom and, if the initial dyestuff contains no free sulfonic acid group, a group imparting solubility in water, advantageously a sulfonic acid group.

The monoazo-dyestuffs of the Formula 5 used as starting materials can be prepared by methods in themselves known by coupling one of the coupling components mentioned above in an acid medium with a diazo-compound which contains, in addition to the diazo-group a substituent convertible into a free amino group, and converting the said substituent into an amino group after the coupling.

As examples of such diazo-compounds there may be mentioned those obtainable from the following amines: 3- or 4-nitro-1-aminobenzene, 4-nitro-4'-aminodiphenyl and the diamines mentioned above or their monoacyl-compounds.

The condensation of the monoazo-dyestuffs of the Formula 5 so obtained with the appropriate reactive halogen-compounds, of which the more easily accessible have been mentioned above, is advantageously carried out in the presence of an acid-binding agent, such as sodium acetate, and under conditions such that a reactive halogen atom remains in the resulting dyestuff condensation product, that is to say, for example, in an organic medium or at a lower temperature in an aqueous medium.

The dyestuffs of this invention are new. They are suitable for dyeing and printing a very wide variety of materials, especially those of animal origin such as leather, silk and above all wool, and also various artificial fibers, for example, of animalized artificial silk, superpolyamides or superpolyurethanes, etc. The dyeings and prints obtainable with these dyestuffs from neutral or weakly acid baths are distinguished by their valuable tints, their level character, their good fastness to light and their very good fastness to washing and fulling, especially under alkaline conditions.

The following examples illustrate the invention, the parts and percentages are by weight unless otherwise stated, and the relationship of parts by weight to parts by volume is the same as that of the kilogram to the liter:

Example 1

39.3 parts of the secondary condensation product from 1 molecular proportion of cyanuric chloride, 1 molecular proportion of aniline and 1 molecular proportion of 2:4-diaminobenzene-1-sulfonic acid are suspended in 400 parts of water and 25 parts of hydrochloric acid of 30 percent strength, and diazotized at about 10–15° C. with 25 parts by volume of a 4 N-solution of sodium nitrite. The slightly yellowish diazo-suspension so obtained is mixed with sodium acetate until the reaction of the suspension is still only weakly acid to Congo. The suspension is then poured into a suspension prepared by dissolving 34.5 parts of 2-amino-8-hydroxynaphthalene-6-sulfonic acid N-methyl-anilide in 105 parts by volume of a 1 N-solution of sodium hydroxide and acidifying the mixture with 100 parts by volume of 2 N-acetic acid. The whole is stirred at 30–35° C. until the coupling is finished, the precipitated dyestuff in its free acid form corresponds to the formula

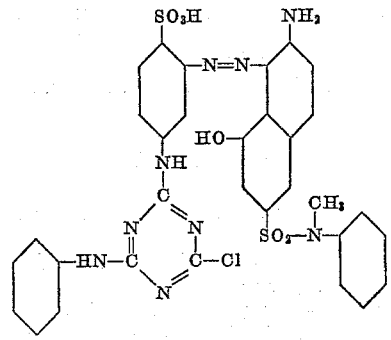

is filtered off and dried in vacuo. There is obtained a brown-red powder which dissolves in hot water with a red coloration and dyes wool from neutral to weakly acid baths pure red tints which are very fast to washing and fulling.

Red-dyeing dyestuffs are also obtained in the manner described in this example by using, instead of the diazo-component and coupling component mentioned above, those given in columns I and II of the following table:

| | I<br>Diazo-compounds of amines of the formula<br>R—C(=N—C(Cl)=N—)N=C—NH—C₆H₃(NH₂)—SO₃H | II<br>Coupling components of the formula<br>HO—naphthalene(SO₂R₁)—NH₂ |
|---|---|---|
| 1 | R=CH₃NH— | R₁=—N(CH₃)(C₆H₅) |
| 2 | R=CH₃CH₂CH₂—NH— | R₁=—N(CH₃)(C₆H₅) |
| 3 | R=C₆H₅—NH— | R₁=—NHCH₃ |
| 4 | R=C₆H₅—NH— | R₁=—NHCH₂CH₂CH₂OCH₃ |
| 5 | R=CH₃— | R₁=—NH—CH₃ |
| 6 | R=C₆H₅— | R₁=—NH—CH₃ |
| 7 | R=CH₃NH— | R₁=—NH—C₆H₃(Cl)(CH₃) |
| 8 | R=CH₃NH— | R₁=—NH—C₆H₃(CH₃)(CH₃) (2,5-dimethyl) |
| 9 | R=CH₃NH— | R₁=—NH—C₆H₃(CH₃)(CH₃) (2,6-dimethyl) |
| 10 | R=CH₃NH— | R₁=—NH—CH(CH₂CH₂)₂CH₂ (cyclohexyl) |
| 11 | R=C₆H₅—NH— | R₁=—NH—CH₂—C(O—CH=CH—) furfuryl |
| 12 | R=C₆H₅—N(CH₃)— | R₁=—N(CH₃)(CH₃) |
| 13 | R=C₆H₅—NH— | R₁=—NHC₄H₉ |
| 14 | R=C₆H₅—NH— | R₁=—N(C₂H₅)(C₂H₅) |
| 15 | R=Cl,Cl—C₆H₃—NH— | R₁=—NH₂ |
| 16 | R=C₆H₅—N(CH₃)— | R₁=—N(C₂H₅)(C₆H₅) |
| 17 | R=C₆H₅—N(CH₃)— | R₁=—NH—CH₂—C(O—CH=CH—) furfuryl |

| | I<br>Diazo-compounds of amines of the formula<br>R—C(=N—)N=C(—Cl)—N=C—NH—C₆H₃(SO₃H)(NH₂) | II<br>Coupling components of the formula<br>HO—naphthalene—NH₂ with $O_2S$—$R_1$ |
|---|---|---|
| 18 | R=phenyl—N(CH₃)— | $R_1$=—NHC₄H₉ |
| 19 | R=phenyl—O— | $R_1$=—NH—CH₃ |
| 20 | R=phenyl—S— | $R_1$=—NH—CH₃ |
| 21 | R=—NH₂ | $R_1$=—N(CH₃)—phenyl |
| 22 | R=(H₃C)₂N— | $R_1$=—N(CH₃)—phenyl |
| 23 | R=(H₃C)₂CH—NH— | $R_1$=—N(CH₃)—phenyl |
| 24 | R=H₃C—(CH₂)₁₁NH— | $R_1$=—NH—CH₃ |

A bluish red dyeing dyestuff is obtained as described in Example 1 by diazotizing the secondary condensation product of 1 molecular proportion of cyanuric chloride, 1 molecular proportion of aniline and 1 molecular proportion of 2:5-diaminobenzene-1-sulfonic acid and coupling the diazo compound with the coupling component mentioned in Example 1. Bluish red dyeing dyestuffs are also obtained in the manner described in Example 1 by using the diazo-components and coupling components given in the following table:

| | I<br>Diazo-compounds of amines of the formula<br>R—C(=N—)N=C(—Cl)—N=C—NH—C₆H₃(NH₂)(SO₂H) | II<br>Coupling components of the formula<br>OH—naphthalene—NH₂ with H₂N— and —$SO_2$—$R_1$ |
|---|---|---|
| 1 | R=CH₃CH₂CH₂NH— | $R_1$=—N(CH₃)—phenyl |
| 2 | R=CH₃NH— | $R_1$=—N(CH₃)—phenyl |
| 3 | R=phenyl—NH— | $R_1$=—NH—CH₃ |
| 4 | R=phenyl—NH— | $R_1$=—N(CH₃)(CH₃) |
| 5 | R=CH₃NH— | $R_1$=—NH—phenyl(CH₃)(Cl) |
| 6 | R=CH₃NH— | $R_1$=—NH—phenyl(CH₃)(CH₃) |

| I<br>Diazo-compounds of amines of the formula<br>R—C(=N)—N=C(Cl)—N=C—NH—⟨benzene(SO₃H)⟩—NH₂ | II<br>Coupling components of the formula<br>H₂N—⟨naphthalene(OH)⟩—SO₂—R₁ |
|---|---|
| 7. R=CH₃NH— | R₁=—NH—⟨2,6-dimethylphenyl⟩ (CH₃, CH₃) |
| 8. R=⟨phenyl⟩—NH— | R₁=—NH—C₄H₉ |
| 9. R=⟨phenyl⟩—NH— | R₁=—NH—CH(CH₂CH₃)(CH₂CH₃... CH₂CH₃) |
| 10. R=⟨phenyl⟩—NH— | R₁=—N(C₂H₅)(C₂H₅) |
| 11. R=⟨phenyl⟩—O— | R₁=—NH—CH₃ |
| 12. R=⟨phenyl⟩—S— | R₁=—NH—CH₃ |
| 13. R=—NH₂ | R₁=—N(CH₃)(⟨phenyl⟩) |

Example 2

52.75 parts of the condensation product of 1 molecular proportion each of cyanuric chloride, 2:5-diaminobenzene-1-sulfonic acid N:N-diethylamide and 1-aminobenzene-3-sulfonic acid are stirred in 1000 parts of water and the mixture is rendered weakly alkaline with sodium carbonate. The suspension is brought to a temperature of 0–5° C. with ice, then mixed with a solution of 6.9 parts of sodium nitrite, and the mixture is then poured into a mixture of 200 parts of hydrochloric acid of 30 percent strength, 200 parts of water and 100 parts of ice. After stirring the mixture for ½ hour in an ice bath, any excess of nitrite ions still present is destroyed with urea, and then a solution of 32.8 parts of 2-amino-8-hydroxynaphthalene-6-sulfonic acid-N-methylanilide in 300 parts of water and 900 parts of acetone is added. After the addition of sodium acetate to produce a reaction neutral to Congo, the whole is stirred in an ice bath until the coupling is finished. The dyestuff in its free acid form corresponds to the formula

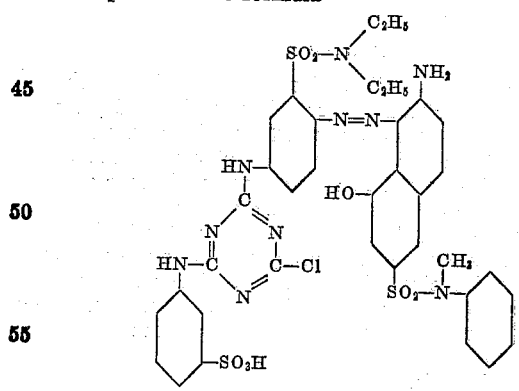

is isolated in the usual manner by neutralization with sodium carbonate, salting out, filtering and drying.

| | Diazo-components | Coupling components | Tints of dyeings on wool |
|---|---|---|---|
| 1 | ⟨aniline(NH₂)⟩—SO₂CH₃ with NH—C(Cl)=N—C(=N)—NH—⟨phenyl(SO₃H)⟩ triazine | H₂N—⟨naphthol(OH)⟩—SO₂NH—CH₃ | Ruby red. |

| | Diazo-components | Coupling components | Tints of dyeings on wool |
|---|---|---|---|
| 2 | ![structure] | ![structure] | Yellowish red. |
| 3 | ![structure] | ![structure] | Bluish red. |
| 4 | ![structure] | ![structure] | Somewhat bluish red. |

There is obtained a brown powder which dyes wool from weakly acid baths bluish red tints having very good properties of fastness.

Dyestuffs from the diazo-components and coupling components given in the table above can be obtained in an analogous manner.

*Example 3*

2 parts of the dyestuff obtainable as described in the first paragraph of Example 1 are dissolved in 4000 parts of water, 10 parts of crystalline sodium sulfate are added to the dyebath, and 100 parts of wool are entered at 40–50° C. There are then added 2 parts of acetic acid of 40 percent strength, the bath is raised to the boil in the course of ½ hour and dyeing is carried on for ¾ hour at that temperature. After rinsing and drying, there is obtained a red dyeing which is fast to light and has a very good fastness to washing and fulling. A red dyeing is likewise obtained without the addition of acetic acid to the dyebath.

What is claimed is:

1. A monoazo-dyestuff containing a single sulfonic acid group and corresponding to the formula $$X-R_1-N=N-R$$

wherein R represents the radical of an aminonaphthalene sulfonic acid amide bound to the azo linkage in vicinal position to the amino group and containing the said sulfonic acid amide group in one of the positions 5 and 6, $R_1$ represents a benzene radical and X represents an amino group bearing a monochloro-1,3,5-triazine substituent, $X-R_1$ containing the single sulfonic acid group present in the dyestuff molecule.

2. A monoazo dyestuff corresponding to the formula $$X-R_1-N=N-R$$

wherein R represents the radical of a 2-aminonaphthalene-6-sulfonic acid amide bound to the azo linkage in 1-position, $R_1$ represents a benzene radical and X represents an amino group bearing a monochloro-1,3,5-triazine group which contains a sulfonic acid group when $R_1$ is free from a sulfonic acid group.

3. A monoazo dyestuff of the formula

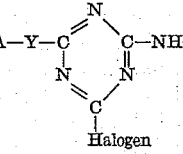

wherein R represents the radical of a 2-aminonaphthalene-6-sulfonic acid amide bound to the azo linkage in 1-position, $R_1$ represents a benzene radical and A represents an aliphatic radical of at most 12 carbon atoms bound to the triazine nucleus through Y which is a member of the group consisting of a direct bond, an oxygen, sulfur and nitrogen bridge, one of the radicals A and $R_1$ containing the single sulfonic acid group present in the dyestuff molecule.

4. A monoazo dyestuff of the formula

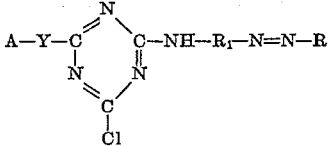

wherein R represents the radical of a 2-aminonaphthalene-6-sulfonic acid amide bound to the azo linkage in 1-position, $R_1$ represents a benzene radical, and A represents a benzene radical bound to the triazine nucleus through Y which is a member selected from the group consisting of a direct bond, an oxygen bridge, a sulfur bridge and a nitrogen bridge, one of the radicals A and $R_1$ containing the single sulfonic acid group present in the dyestuff molecule.

5. A monoazo dyestuff which in its free acid state corresponds to the formula

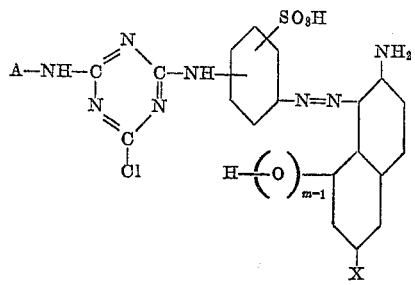

wherein A represents a hydrocarbon radical of at most 12 carbon atoms, X represents a sulfonic acid amide group and $m$ a whole number up to 2.

6. A monoazo dyestuff of the formula

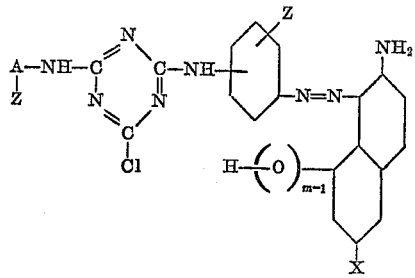

wherein A represents a benzene radical, X a sulfonic acid amide group, one Z a sulfonic acid group, the other Z a hydrogen atom and $m$ a whole number up to 2.

7. A monoazo dyestuff which in its free acid state corresponds to the formula

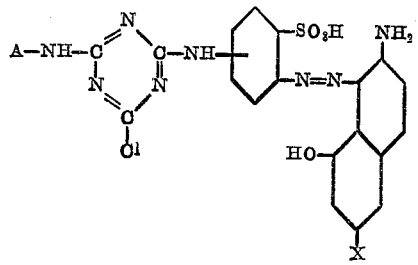

wherein A represents an alkyl group of at most 3 carbon atoms and X represents a sulfonic acid amide group.

8. A monoazo dyestuff which in its free acid state corresponds to the formula

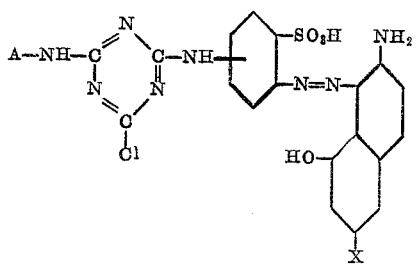

wherein A represents a benzene radical and X represents a sulfonic acid amide group.

9. The monoazo dyestuff which in its free acid state corresponds to the formula

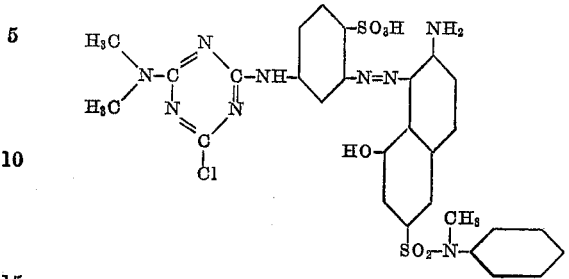

10. The monoazo dyestuff which in its free acid state corresponds to the formula

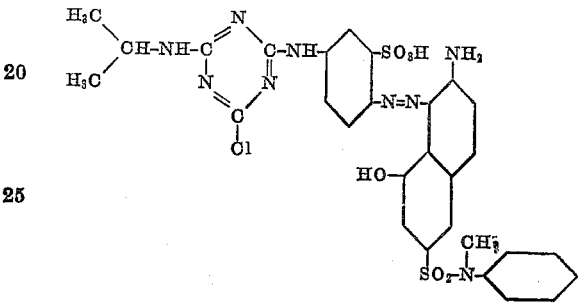

11. The monoazo dyestuff which in its free acid state corresponds to the formula

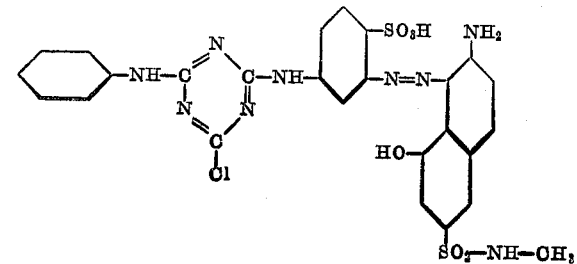

12. The monoazo dyestuff which in its free acid state corresponds to the formula

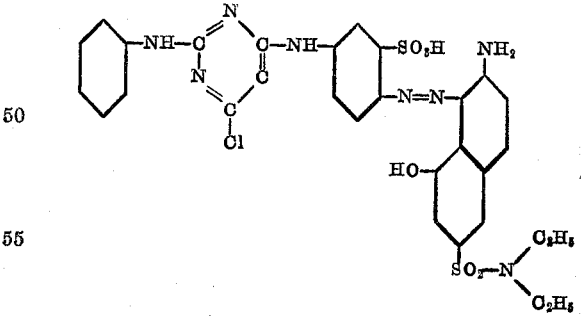

References Cited in the file of this patent
UNITED STATES PATENTS

| | | |
|---|---|---|
| 2,374,157 | Kvalnes | Apr. 17, 1945 |
| 2,722,527 | Wehrli | Nov. 1, 1955 |

OTHER REFERENCES

Venkataraman: Synthetic Dyes, 1952, pp. 473, 540.

UNITED STATES PATENT OFFICE
Certificate of Correction

Patent No. 2,889,316  June 2, 1959

Alphonse Heckendorn et al.

It is hereby certified that error appears in the printed specification of the above numbered patent requiring correction and that the said Letters Patent should read as corrected below.

Column 4, line 50, for "dyestuff" read —dyestuff which—; columns 5 and 6, in the table, under the heading "II", opposite "7", the formula should read as shown below instead of as in the patent:

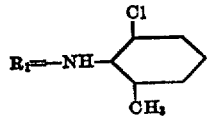

column 10, line 40, for "dyestuff" read —dyestuff which—.

Signed and sealed this 27th day of October 1959.

[SEAL]

Attest:
KARL H. AXLINE,
*Attesting Officer.*

ROBERT C. WATSON,
*Commissioner of Patents.*